Dec. 4, 1962     H. E. DIECKMANN     3,066,444
FOWL CALL
Filed March 9, 1960
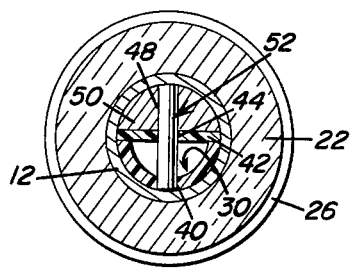
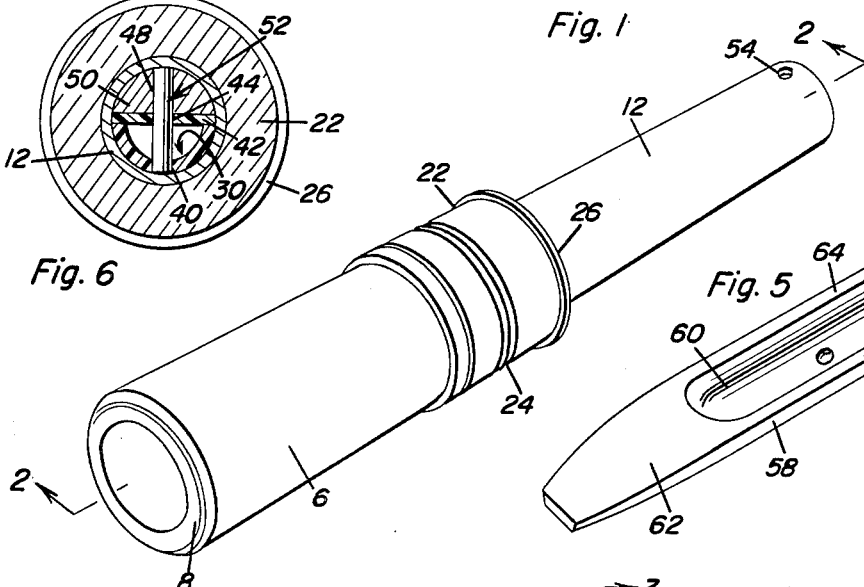
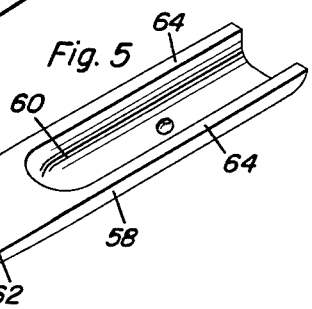
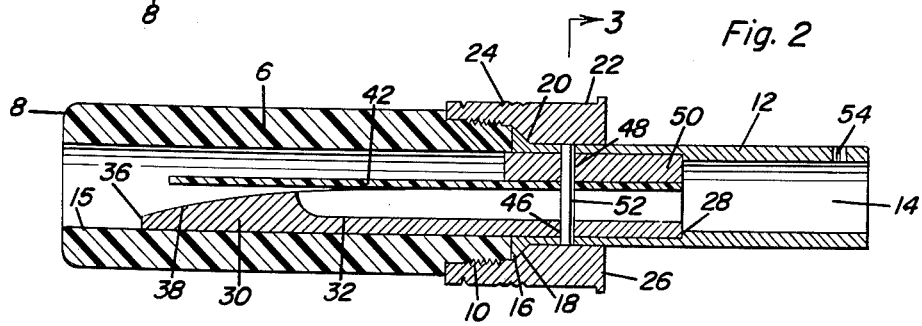
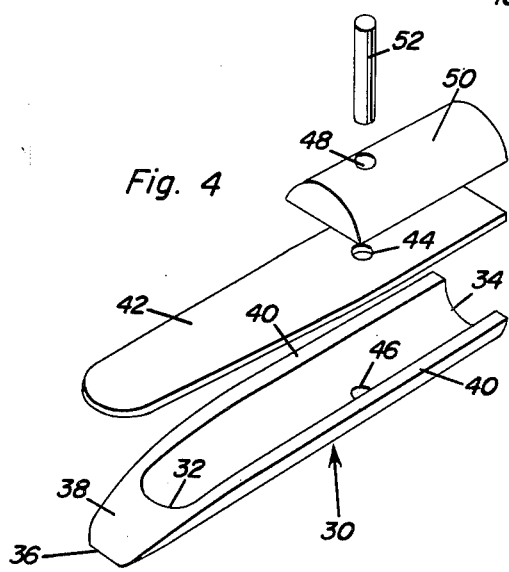
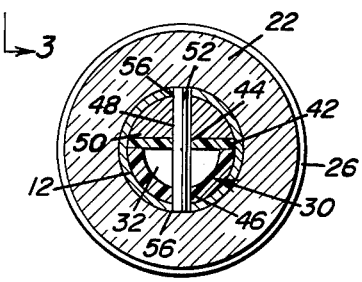
Herbert E. Dieckmann
INVENTOR.

United States Patent Office 3,066,444
Patented Dec. 4, 1962

3,066,444
FOWL CALL
Herbert E. Dieckmann, 1308 South, Vandalia, Ill.
Filed Mar. 9, 1960, Ser. No. 13,738
7 Claims. (Cl. 46—180)

The present invention relates to certain new and useful improvements in a structurally and functionally distinct fowl call which is such in construction and purpose that it may be used, when properly and skillfully handled, as a caller for ducks, geese, hawks, birds and also for animals.

Persons conversant with the art to which bird and fowl calls relate are aware that many and varied styles and forms of callers have been divised and offered for use. In fact, such devices are actively in widespread use and considered from a broad structural point of view these devices are generally alike in construction and yet are specifically distinguishable. An obvious object in the instant matter is to structurally and otherwise improve upon analogous callers and, in so doing, to provide a construction which, it is submitted, better fulfills the requirements of manufacturers, aims of retailers, and what is more important, will meet the desired needs of users who would seek the ultimate in a fowl and bird call.

In carrying out the aims herein under carefully considered attention it will be noticed that the body structure of the call is characterized by three cooperating components; namely, two end-to-end sleeves with the abutting ends separably united and held together by a surrounding coupling. The first sleeve, which constitutes the mouthpiece, is longer than the second sleeve and is of a greater cross-section and preferably constructed of a suitable grade of plastic material. The second sleeve is of a cross-section less than the first sleeve but has a bore whose cross-section corresponds to the bore of the first sleeve.

The adopted construction is also unique in that the inner abutting end of the shorter smaller sleeve, which constitutes the tone emitting barrel (sometimes referred to as a horn) is provided at its inner abutting end with an outstanding beveled flange, the beveled surface of which cooperates with a beveled shoulder provided therefor on the the interior of the coupling.

It will also be noticed that the coupling may be slipped endwise over the smaller or second sleeve and threadedly connected with the cooperating inner end of the first sleeve, said coupling providing a shoulder at the sound emitting end of the second sleeve so that the second sleeve and shoulder provide a satisfactory means for securely grasping and holding the over-all device while it is being used and particularly when the tips of the fingers are being employed in diverse ways to time and change the sound wave blasts.

Particular attention is directed to the fact that the reed holder is of plug-like construction, the lower section thereof providing a base which in turn provides a lay for the reed. A cork or an equivalent block is superimposed on the butt end of the reed and functions as a sort of a ligature. The reed is sandwiched between the base and cap-like block and the several parts are provided with registering holes to accommodate an insertable and removable pin which functions with requisite nicety in providing a three-part assembly which is easy to handle and which insures the proper relationship of the components and particularly "pins" the reed on and in proper relationship to the lay.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a call constructed in accordance with the principles of the present invention.

FIG. 2 is a section on the line 2—2 of FIG. 1 looking in the direction of the arrows.

FIG. 3 is a cross-section on the line 3—3 of FIG. 2.

FIG. 4 is an exploded perspective view showing the reed assembly.

FIG. 5 is a view in perspective of a slightly modified reed base.

FIG. 6 is a cross-section which is approximately the same as that identified above as FIG. 3 but wherein a slight modification in the shape of the pin is shown.

The aforementioned first sleeve, which is open-ended, is denoted by the numeral 6 and is preferably constructed from a plastic material and the air blowing end is suitably rounded off or convex as at 8 adapting this sleeve to serve as a mouthpiece. The inner end is slightly reduced in cross-section and screw-threaded as at 10. The second sleeve 12, also non-corrodible, is of a length less than the first sleeve 6 and also of a lesser cross-section. The bore 14 corresponds in cross-section to the bore 15 of the mouthpiece. The inner end of sleeve 12 is provided with an outstanding endless clamping flange 16 which is beveled as at 18 to correspond with a bevel 20 on the interior of the readily applicable and removable coupling 22. This coupling is slipped over the sleeve 12 from right to left and has a knurled or equivalent gripping surface 24 on the exterior. The coupling is of course threaded so that it may be screwed on the threads 10. The outstanding surface 26 of this coupling provides a shoulder at the inner or median end portion of the sleeve 12. This sleeve 12 provides the tone barrel. It will be noticed that the inner end of the second sleeve 12 is counterbored to provide a socket and a shoulder 28 at the end of the socket and this socket is adapted to telescopically and removably receive the several components which go to make up the plug-like insertable and removable reed assembly. This assembly as shown in FIG. 4 comprises an elongated tongue-like base 30 of wood or suitable material having a channel or groove which is closed at one end as at 32 and open at the opposite end as at 34. This groove provides the tone chamber. The air intake end or tip of this base is reduced in width and cross-section as at 36. The declivity 38 and cooperating surfaces 40 collectively provide a lay for the vibratory reed 42. The reed is of a length slightly less than the base as brought out in FIG. 2. The reed has a pin hole therein as at 44 which registers with a companion pin hole 46 and with a third pin hole 48 in the semicircular cork or equivalent block 50. These holes (44, 46 and 48) when registered serve to accommodate the insertable and removable retainer pin 52. This pin keeps the parts in proper relationship so that they may be easily handled by one who does not have the patience to properly "sandwich" the reed in place and to locate it properly on the lay surfaces 38 and 40.

Referring again to the second named sleeve 12 it will be observed that it may be provided at one end with a hole or opening 54 to accommodate a chain, cord or the like (not shown) to facilitate attaching the call to one's apparel belt or elsewhere. Also, if desired, the end portion at the left in FIG. 2 of the sleeve 12 which is embraced by the coupling 22 may be provided with diametrically opposite holes 56 to accommodate extended end portions of the pin 52 to, in this manner include the sleeve or barrel 12 as a part of the reed assembly.

It is submitted that the various views of the drawing illustrate all of the details and also show how they are made separate and how they are assembled (FIGS. 1, 2 and 3) for use. In FIG. 5 the base of the reed assembly is much the same as the one 30 seen in FIG. 4. The only difference is in proportions. In other words, this reed base 58 has a shorter tone chamber 60, a longer declivity 62 and a shorter companion surface 64 which go to make up the lay for the reed. It is desirable to change the sound output in instruments of this category and therefore this can be done by changing the coacting features proportionally but since this aspect of the concept is incidental it will not be dwelled upon here.

By comparing the construction depicted in FIG. 6 with that shown in FIG. 3 it will be evident that the modification is slight but nevertheless significantly important. In other words, as shown in FIG. 6 it may be desirable to shorten the pin 52 so that the end portions thereof will terminate within the diameter of the encompassing bore of the aforementioned second sleeve 12. Stated otherwise instead of providing the sleeve 12 with the previously mentioned keeper holes 56 the holes are being eliminated here and the ends of the pin 52 terminate flush with the cooperating portions of the convex surfaces of the component parts 30 and 50. It follows that the several component parts, that is the tongue-like base 30, reed 42 and block 50 may be pinned together to thus provide a three-part assembly. This assembly may, under these circumstances, be readily handled and inserted and removed. As a matter of fact, it is conceivable that this same three-part assembly might perhaps be satisfactorily utilized by omitting the pin 52 and the pin holes 44, 46 and 48 seen in FIG. 4. In other words, by making the assembly with the exterior surfaces having a one degree taper the assembly could be friction held in the operative position shown for example in FIG. 2.

The manner of using callers is so well known that it is also unnecessary to attempt to explain the different techniques restored to. The users employ their own ideas in drumming up and imitating wild life calls and for this reason it is only necessary to know that one places the mouthpiece 6 in the mouth and blows therethrough either lightly or forcibly if desired setting the reed into vibration. The sound waves or tone waves escape through the discharge end of the bore of the barrel or sleeve 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fowl call comprising a first elongated sleeve providing a mouthpiece, a readily applicable and removable second sleeve of prescribed length providng a tone resonating barrel and axially aligned with said first sleeve and having a rearward end abutting a cooperating forward end of said first sleeve, a separate coupling slidingly and removably mounted on the second sleeve and encompassing the abutting end portions of both sleeves and positioning the same so that the bores thereof are in cooperative alignment, the end portion of the bore of said second sleeve adjacent said abutting ends having a counterbore providing a shouldered socket, and a reed holder telescoping into the bore of the first sleeve and having a plug-like end portion removably plugged into said shouldered socket, said second sleeve being of a cross-section less than the cross-section of the first sleeve, the rearward abutting end of said second sleeve terminating in an outstanding endless flange the forward surface of which is bevelled, a cooperating terminal surface of the bore in said coupling having a corresponding and conforming bevelled clamping shoulder bound firmly against the bevelled surface of said flange and clamping the flange against the coacting end of said first named sleeve, said reed holder comprising a base having an open-ended channel defining a tone chamber and reed seating lay, a vibratory reed seated on the lay and overlying the same and said tone chamber, said reed when vibrated producing a tone of a given pitch, and a reed hold-down block superimposed upon the shank portion of the reed, said base and block and interposed reed conjointly defining said plug-like end portion and serving as a seal for the bores of the sleeves and constraining and directing the air to flow between the reed and lay and into said tone chamber.

2. The structure defined in claim 1, and wherein the said base, reed and block have registering pin holes, and an assembling and retaining pin passing removably through said holes.

3. The structure defined in claim 1, and wherein the said base, reed and block have registering pin holes, and an assembling and retaining pin passing removably through said holes, and the counterbored portion of said second sleeve also having aligned pin holes therein lined up with the first-named registering holes, the terminal end portions of said pin fitting into said last-named holes and being concealed and covered by said coupling.

4. A fowl call comprising a first elongated sleeve having a straight axial bore of uniform diameter therethrough and providing a mouthpiece, a second sleeve complemnetal to the first sleeve and providing a tone barrel and having a straight bore axially aligned with and of the same diameter as the bore in said first sleeve and having one end abutting a cooperating forward end of said first sleeve, a coupling surrounding the abutting end portions of said sleeves and physically connected thereto and joining the sleeves together so that the bores thereof are in cooperative alignment, the end portions of the bore of said second sleeve adjacent said abutting ends having a counterbore providing a shouldered socket, and a plug-in reed holder mounted primarily and removably in the bore of the first sleeve and having an end portion telescoping into said shouldered socket, the median portion of said reed holder bridging the abutting ends of said sleeves, said reed holder comprising an elongated base, an end portion which extends into the bore of the first sleeve and another end portion telescoping into the shouldered socket and abutting the shoulder in the socket, a lengthwise side of said base having a longitudinal groove closed at an inward end end open at the outward end and providing a tone chamber, a portion of said lengthwise side being substantially flat and constituting a reed supporting lay, a vibratory reed having a shank portion seated on the lay and its unseated vibratory portion overlying the tone chamber, the grooved portion of said base being substantially semi-circular in cross-section, and a block semi-circular in cross-section, said block being of a length appreciably less than the length of the base and having a flat side superimposed on a coating end portion of the shank of the reed in a manner to clampingly hold the reed sandwiched between the block and base, the cooperating end portions of the block, reed and base fitting telescopically and snugly into the shouldered socket and providing an air and saliva seal.

5. The structure defined in claim 4 and wherein the outside diameter of the semi-circular block, shank of the base and the intervening reed is approximately the same as the inside diameter of the shouldered socket to provide a snug fitting coaction between the surfaces of the wall of the shouldered socket and exterior surfaces of the block, reed and base, said block, reed and base having aligned pin holes, and a connecting and orienting pin removably fitted into said holes, said pin being of a length aproximately the same as the cross-section of the shouldered socket whereby to allow the reed holder and reed as an assembly to be handled as a unit when either inserted to position of use or removed from an in-use position.

6. A fowl call comprising, in combination, an insertable and removable changeable reed assembly comprising an elongated base having a longitudinally channeled body portion semi-circular in cross-section and having surface portions providing a reed seating lay, a reed having a flat-faced shank removably seated on said lay, a relatively short reed hold-down block semi-circular in cross-section and having a flat surface superimposed atop said shank, said base and block considered conjointly being substantially circular in cross-section and providing a plug, said block, reed and base each having a pin hole and said pin holes being in alignment with each other, an insertable and removable pin fitted into said pin holes and connecting the block, reel and base together, a cylindrical open-ended sleeve providing a resonator-type tone barrel, said sleeve being of the cross-section and length desired to establish the pitch and tone intended and having a counterbore at a rearward end providing a socket, the plug portion of the reed assembly being telescopically plugged into said socket, a second sleeve having a forward end abutting the rearward end of the first-named sleeve and telescopically receiving the vibrating reed end of the assembly, and means separably coupling the abutting ends together.

7. The structure defined in claim 6 and wherein said means comprises a coupling slidingly and removably mounted on and encircling the first-named sleeve and removably secured to the forward end of the second-named sleeve and abutting an assembling and retaining flange at the rearward end of the first-named sleeve, said first-named sleeve being of a cross-section less than the cross-section of the coupling and projecting beyond the forward end of the coupling, said forward end of the coupling providing finger abutting shoulder means, whereby the call, as an entity, may be held in one hand, the two fingers straddling the first-named sleeve and resting against the coupling, permitting the other hand to be cooperatively associated with the tone discharge end of the first-named sleeve in a manner to vary the tone emanating from said first-named sleeve.

References Cited in the file of this patent
UNITED STATES PATENTS

| | | |
|---|---|---|
| 813,853 | Brunner | Feb. 27, 1906 |
| 1,324,674 | Johnson | Dec. 9, 1919 |
| 2,493,472 | Yentzen | Jan. 3, 1950 |
| 2,515,023 | Thomson et al. | July 11, 1950 |
| 2,598,268 | Kendrick | May 27, 1952 |
| 2,604,731 | Meucci | July 29, 1952 |
| 2,608,796 | Bicocchi | Sept. 2, 1952 |